United States Patent
Stephan et al.

(10) Patent No.: US 9,692,785 B2
(45) Date of Patent: Jun. 27, 2017

(54) SYSTEMS AND METHODS FOR DETECTING AND PREVENTING CYBER-THREATS

(71) Applicant: PIERCE GLOBAL THREAT INTELLIGENCE, Dunn Loring, VA (US)

(72) Inventors: Roy Stephan, Dunn Loring, VA (US); Vladimir Tereshkov, Dunn Loring, VA (US)

(73) Assignee: PIERCE GLOBAL THREAT INTELLIGENCE, Dunn Loring, VA (US)

(*) Notice: Subject to any disclaimer, the term of this patent is extended or adjusted under 35 U.S.C. 154(b) by 163 days.

(21) Appl. No.: 14/771,114

(22) PCT Filed: Mar. 4, 2014

(86) PCT No.: PCT/US2014/020401
§ 371 (c)(1),
(2) Date: Sep. 4, 2015

(87) PCT Pub. No.: WO2014/138115
PCT Pub. Date: Sep. 12, 2014

(65) Prior Publication Data
US 2016/0021139 A1    Jan. 21, 2016

Related U.S. Application Data

(60) Provisional application No. 61/851,250, filed on Mar. 5, 2013.

(51) Int. Cl.
*H04L 29/06* (2006.01)
*G06F 21/55* (2013.01)
(Continued)

(52) U.S. Cl.
CPC .... *H04L 63/1466* (2013.01); *G06F 17/30563* (2013.01); *G06F 17/30592* (2013.01);
(Continued)

(58) Field of Classification Search
CPC ......... H04L 63/02; H04L 63/10; H04L 63/20; H04L 63/1425; H04L 63/1466; G06F 17/30563; G06F 17/30592; G06F 17/552
See application file for complete search history.

(56) References Cited

U.S. PATENT DOCUMENTS

2002/0038430 A1    3/2002  Edwards et al.
2006/0136462 A1*   6/2006  Campos ............ G06F 17/30539
(Continued)

OTHER PUBLICATIONS

International Search Report in PCT/US2014/020401 dated Jul. 18, 2014, 3 pages.

*Primary Examiner* — Jeffrey Pwu
*Assistant Examiner* — Thong Truong
(74) *Attorney, Agent, or Firm* — Goodwin Procter LLP (57) ABSTRACT

A system (100) for detecting and preventing cyber-threats is disclosed. The system (100) can include an online-analytical-processing (OLAP) resource (102) coupled to a data mining engine (104), a reporting resource (106) and a processor (108). The processor (108) can run instructions stored within an extract-transform-load (ETL) module (112). The ETL module (112) can enable the processor (108) to extract one or more data tuples various data sources (110). The ETL module (112) can enable the processor to transform the extracted tuple(s).

20 Claims, 3 Drawing Sheets (51) Int. Cl.
*G06F 21/62* (2013.01)
*G06F 17/30* (2006.01)
*H04L 29/08* (2006.01)

(52) U.S. Cl.
CPC ........ *G06F 21/552* (2013.01); *G06F 21/6227* (2013.01); *G06F 21/6254* (2013.01); *H04L 63/02* (2013.01); *H04L 63/1425* (2013.01); *H04L 63/20* (2013.01); *H04L 67/10* (2013.01)

(56) References Cited

U.S. PATENT DOCUMENTS

| | | |
|---|---|---|
| 2008/0082393 A1 | 4/2008 | Ozzie et al. |
| 2011/0264608 A1 | 10/2011 | Gonsalves et al. |
| 2012/0185945 A1 | 7/2012 | Andres et al. |
| 2012/0314868 A1 | 12/2012 | Bernheim et al. |

\* cited by examiner

SYSTEMS AND METHODS FOR DETECTING AND PREVENTING CYBER-THREATS

FIELD

The present disclosure relates to providing security against cyber threats to computer networks and computer systems.

BACKGROUND

Malicious actors, including malicious software elements, often reside in host systems and host devices that are unaware of the presence of the malicious actor. Although attempts to protect computers and computer systems from such malicious actors have been made, malicious actors remain a problem.

BRIEF DESCRIPTION OF THE DRAWINGS

Embodiments of the present disclosure will now be described by way of example with reference to attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In order to better clarify the subject matter within this disclosure, it will be appreciated that throughout this disclosure the use of the singular form of a term or word includes the plural and vice-versa, unless specifically indicated otherwise.

At least one object of this disclosure is to enable owners of networks and/or devices to be made aware of malicious clients/actors/devices which might try to communicate with or infiltrate such networks and/or devices.

At least one object of this disclosure is to enable owners of networks and/or devices to alert other owners when they are attacked by malicious clients/actors/devices. As will be described below, alerting can be done in a secure manner that enables the clients/actors/devices to be identified and tracked while preserving the anonymity of the unintentional host of such client/actor/device. This can prevent infected machines from striking repeatedly across the internet.

At least one object of this disclosure is to provide a system which is capable of coordinating response to threats from multiple different vendors, thereby providing a global view of cyber-threats acting throughout the world.

At least one object of this disclosure is to provide systems and methods that enable data sources to report threat data and/or information about malicious actors/machine/devices while not transmitting information which is not relevant to the threat data local to the data source. Such non-transmission can reduce cost and response times.

At least one object of this disclosure is to enable companies to validate the security of devices and networks that are external to the networks and devices that the companies control.

At least one object of this disclosure is to solve the problem of identifying malicious actors (e.g. hackers, crackers, virus owners, Trojan software, botnet zombies, botnet command and control, etc.) that are communicating to or from a network or Internet connected device.

At least one object of this disclosure is to provide systems and methods for separating the legitimate traffic of employees, partners and customers from traffic coming to and/or from malicious actors.

At least one object of this disclosure is to increase the volume and efficiency of data transfer and analysis.

At least one object of this disclosure is to provide systems and methods for validating the security of networks/device/companies. This can involve examining a company's internal security and comparing it to a security measure derived from data sources external to the company.

At least one object of this disclosure is to provide systems and methods for validating the security of the user of a device. This can involve combining information about all of the devices used by a particular user.

Within the present disclosure, the following non-limiting definitions apply:

"Cyber-threat" refers to the possibility of a malicious attempt to damage or disrupt a computer network or system, an effort to leverage a computer network or system and information to cause physical harm or disruption of infrastructure, a potential of premeditated use of disruptive activities against computer networks or systems, with the intention to cause harm or further social, ideological, religious, political or similar objectives, or any identified effort directed toward access to, exfiltration of, manipulation of, or impairment to the integrity, confidentiality, security, or availability of data, an application, or a federal system, without lawful authority.

"Data mining" includes, but is not limited to, a process of analyzing large sets of data to discover patterns or relationships; to extract information from large sets of data and transform it into an understandable structure for further use.

"Extract-Transform-Load" includes, but is not limited to, processes in database usage and especially in data warehousing that extract or read data from outside sources, transforms, or converts, the data to fit operational needs, which can include quality level, and loads, or writes, the data into an end target.

"Normalize," "normalizing," or "normalization" includes, but is not limited to, adjusting values measured on different scales to a notionally common scale, bringing the entire probability distributions of adjusted values into alignment, or the process of organizing the fields and tables of a relational database to minimize redundancy and dependency.

"Online-analytical-processing (OLAP) resource" includes, but is not limited to, a category of software tools that provides analysis of data stored in one or more databases which enables a user to analyze different dimensions of multidimensional data interactively from multiple perspectives.

"Processor" includes, but is not limited to, a machine that processes something or the logic circuitry that responds to and processes the basic instructions that drive a computer.

"Sensitive information" includes, but is not limited to, personal, privileged or proprietary information that only certain people are allowed to see and that is therefore not accessible to everyone.

"Tuple" includes, but is not limited to, an ordered list of elements, an ordered set of data constituting a record, or a data structure consisting of comma-separated values passed to a program or operating system.

"Plugin" and/or "plug-in" include, but are not limited to, software components that add a specific feature to an existing software application. Software applications that support plug-ins enable customization.

"Malicious actor" includes Botnet C&C Servers, spam hosts, virus sources, Trojan sources, and sources of phishing attacks, and the like.

"Security Information and Event Management" (SIEM) includes, but is not limited to, software and products services combining security information management (SIM) and security event manager (SEM). SIEM technology can provide real-time analysis of security alerts generated by network hardware and applications. SIEM can be software, appliances or managed services, and are also used to log security data and generate reports for compliance purposes.

"Client" includes, but is not limited to, any single machine, including a single virtual machine. In a client-server communication process, the client is machine that initiates the connection. These clients tend to be the smaller, more user-driven machine (e.g. desktop, smartphone, etc.), although clients can be large devices and rack-mounted that are often called "physical servers."

"Enterprise" includes, but is not limited to, a managed network of devices including client and/or server machines. "Enterprise security" means a security product or process that assumes a higher level of knowledge from its administrators and is designed to manage a larger number of clients than a personal security solution.

"Threat" means a threat to the integrity of an electronic system. "Local threat" includes, but is not limited to, viruses, Trojans, zero-Day attacks, dns attacks, and smurf attacks. "Global threats" can involve the recording sharing of large numbers of local threats in the hope that patterns will emerge from this recorded knowledge that will be useful in predicting and/or ultimately preventing attacks from local threats.

"Global threat data" includes, but is not limited to, any collection of threat data from multiple sources or locations. Global threat data can exist in any format, size or and can exist for any length of time. Newer threat data is more useful than older threat data. That fact generally drives a high turn-over of threat data storage.

"Cyber threat" (or more simply "threat") includes, but is not limited to, threats coming into an organization digitally and affecting attacks against digital resources and digitally controlled resources.

"Malicious actor" includes, but is not limited to, a device that is performing actions that may hurt another device. Typical actions include removing data, corrupting data in place by deletion or addition, or disabling a device or application so that it cannot perform its normal function optimally. Devices can sometimes be linked back to people or organizations of people, but this is not always possible.

"Malicious inbound client" includes, but is not limited to, a malicious actor that is outside a network which attempts to gain access to the network.

"Threat data" includes, but is not limited to, information about an attacker, an attack or the potential for such an attack.

"Sensitive communication" includes, but is not limited to, any communication containing personally identifiable data such as names, locations, financial information and/or healthcare information.

"Plug-in" (or plugin) includes, but is not limited to, a small software program, also called a module, that takes general information, such as a threat score, and translates it into a specific language such as an API or protocol that a security device understands. This is done for the purpose of being able to educate that device about threats so that the device can take corrective action (e.g. blocking or limiting access) when necessary.

"Log manager" includes, but is not limited to, any searchable storage of log files, and/or a device configured to report or search such stored log files.

"Security information event" includes, but is not limited to, an attack and/or communications related to threats that may become attacks.

"Scalable" is a term that refers to how flexible an architecture is by its nature. A system that is scalable or "scales well" is more likely to work with other systems and/or data sets of different sizes than a system that is not very scalable or does not scale well.

"Network" means one or more devices connected together.

"Network" includes, but is not limited to, enterprise networks.

"Source of threat data" or "data source" includes, but is not limited to, any device or application that logs information.

"Normalization" includes, but is not limited to, putting data in a common format.

"Honeypot" includes, but is not limited to, a machine (physical or virtual) that appears to be a normal Internet connected machine. This machine is seen by hackers as a potential attack surface (sometimes the machine is purposefully lacking security in order to look especially attractive). When a hacker attacks this machine, they are caught in the net and observed for tactics techniques and processes while being denied any sensitive data.

"Security information event manager" (SIEM) includes, but is not limited to, a log manager capable of identifying and/or analyzing threats.

"Command and control server" (C&C server) includes, but is not limited to, a server that tells a compromised machine where and when its next attack will occur, and who will attack.

A "triggering signature" means a pattern of behavior corresponding to a known pattern of cyber-attack. As hackers are observed creating new attacks, the security community documents what these attacks look like as "signatures". The signatures are then deployed across a network or across all networks in order to trigger an alert anytime an attacker uses that particular attack on a network.

"Heuristic rule" includes, but is not limited to, customizations to protect a local network. They often involve whitelisting, or documenting all of the "good" traffic on your network. This allows administrators to say that anything falling outside of the "good" traffic is "bad". These are the opposite of signatures, which are designed to be universal identifiers of attack (e.g. bad traffic); a heuristic rule is a highly customized local identifier of an attack (e.g. not good traffic).

"Cloud" includes, but is not limited to, a hosted solutions provider that provides hosted virtual machines or applications as a service, rather than as a product.

"Botnet" includes, but is not limited to, a network of infected machines that is in control of a hacker, usually operating remotely. Botnets are used to launch massive attacks.

"Unique ID" includes, but is not limited to, an anonymous number assigned to an actor.

"Inbound connection" includes, but is not limited to, a connection from a device outside of a network to a device inside of a network.

"Traditional global threat data" includes, but is not limited to, delivering large volumes of general threat data without targeting it to the organization for relevance.

"Normalized traditional global threat data" includes, but is not limited to, global threat data that has been ingested enough for it to be given a uniform format regardless of the data source where it came from.

"Hadoop" includes, but is not limited to, a big data tool that is used to process large volumes of information in real-time.

"Domain name system" means the Domain Naming System, provides a mapping of IP Addresses to Machine Names.

"DNS hierarchical chain" includes, but is not limited to, a well document part of the existing DNS system that links together servers and domain names. An example would be how www.yahoo.com links a web server to the company Yahoo™, linked to the US "com" register. If a user were to go to "com" and ask for "Yahoo™," it knows how to redirect the user to Yahoo's™ systems, which in turn knows how to direct the user to the right "www" system.

"Clustering" includes, but is not limited to, is the process of having many machines working together toward a common problem. Clustering is one way to implement big data to solve a large data problem. See "scalability" above.

"Probabilistic identity resolution" includes, but is not limited to, the process of identifying the likelihood that a person or device purporting to be a person or device is in fact the purported person or device.

"Client tracking" includes but is not limited to actor identification.

"Phishing event" or "phishing attack" includes, but is not limited to, spam (junk email) that encourages a user to click on a malicious site.

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure pertains to systems and methods of securing computers and computer networks against malicious actors and/or malicious devices and/or malicious software.

At least one aspect of this disclosure pertains to large amounts of data from inside and outside an organization to determine which devices are malicious, and how malicious they are. That knowledge is then given to the administrators in a prioritized report through a reporting system that enables the administrator to manually update their security devices and processes in order to exclude malicious machines from sensitive communications.

At least one embodiment of this disclosure includes plug-in modules that enable automatic reconfiguration of security devices in order to reduce the manual labor and the time it takes to enact these changes and increase protections.

Various aspects of this disclosure pertain to systems which are hosted online. A system is hosted online when use of its software is available online (the implementing software is not downloaded to the accessing device). It may be a physical server or virtual server, it may be located at a Private Datacenter, or a Public Datacenter (Co-location facility, cloud provider, etc). In at least one embodiment within this description, a searchable storage of threats is disclosed.

Aspects of this disclosure pertain to solutions to large data problems. In relative terms, a large data problem occurs when a device or system uses a storage and search capability that cannot keep up with growing amounts of data. Historically, text-based storage had a large data problem that led to relational databases (RDBMS) popularity growth and now RDBMSs are having a large data problem that is fueling 'big data' solutions like Cassandra™ and Hadoop™.

At least one embodiment within this disclosure is a global network of information about cyber threats coming from clients and servers for the purpose of making those who participate with the systems described herein more secure. This is achieved at least in part by identifying malicious actors quickly and enabling those malicious machines to be excluded from sensitive communications. The systems and methods described herein enable the identification of malicious actors and the exclusion of malicious machines to be done quickly and automatically, as will be described in greater detail herein.

At least one embodiment within this disclosure includes a service that algorithmically ranks the all the data it has received about an actor (e.g. a person, set of persons, device, or network of devices, physical or virtual). This rank is called a threat score, zero represents the lowest risk to a network and there is no maximum. The threat score is a single number (with supporting background information on data sources) that acts as a normalized summary of all of the information regarding a particular actor. The systems within this disclosure increase the customer's knowledge, while decreasing the raw data that customers need to sift through themselves.

At least one embodiment within this disclosure includes a reporting system that summarizes and highlights a company's overall security posture based on the presence and actions of malicious actors that have a high threat score. These reports prioritize the machines in an organization by how much risk they present and therefore give an actionable list of how a limited set of IT resources can be most optimally applied to solve the worst problems they face first to reduce the risk of cyber-attack.

In at least one embodiment within this disclosure is a system that utilizes a Domain Name System-modeled protocol to manage a hierarchical system of servers hosting the at least one data source, thereby enabling the system to operate in real-time or in near real-time.

In at least one embodiment within this disclosure, a threat score can be assigned to a user. A user's threat score can be compiled from the threat scores of the devices that the user uses.

At least one embodiment within this disclosure includes a plugin for existing security products that will allow these products to take automated action (such as blocking, or restricting access) based on the Threat Score. This system provides automation to further optimize the finite resources of an IT organization within an enterprise, or other user of the disclosed system(s).

In at least one embodiment of a system within this disclosure increases the amount information available to customers by identifying the knowledge of malicious actors within each customer and globalizing that knowledge so that all system customers can be protected against threats that are known to each of its customers. The system protects the privacy of the data through anonymization. The system is thereby able to increase overall knowledge pertaining to malicious actors by increasing the amount of information available to the threat score calculations, which makes the threat score calculations more accurate, more trustworthy, and ultimately, more actionable.

At least one embodiment within this disclosure includes a global threat database. At least one embodiment within this disclosure includes a report plugin which can be used by personnel such as log managers and security information event managers. At least one embodiment within this disclosure includes a protect plugin configured to provide enterprise-class security solutions. These plugins can operate on one or more devices. The Global Threat Database can be configured to uses a distributed network to coordinate and communicate with the plugins at a local level. In at least one embodiment within this disclosure, a report plugin and/or a protect plugin can be configured to utilize open standard languages and/or protocols such as structured query language (SQL). In at least one embodiment within this disclosure, a report plugin and/or a protect plugin can be configured to utilize and/or cooperate with vendor-specific Application Programmer Interfaces (APIs) in order to pull and push information at a local level.

In at least one embodiment within this disclosure, a global threat database can be hosted by an online server, such as for example, Amazon Web Services™. In at least one embodiment within this disclosure, the plugins described above, as well as other appropriate plugins.

In at least one embodiment within this disclosure is a centralized database (or equivalent data store, such as for example, Hadoop), configured to perform some or all of the functions of the global threat database discussed above. However, the global threat data base would be more scalable, faster, and more efficient that such a centralized database or its equivalent.

In at least one embodiment within this disclosure, a global threat database can track and store information about hosts and data sources. In at least one embodiment within this disclosure, a global threat database can assign and/or store threat rankings and/or threat scores relating to hosts and data sources. In at least one embodiment within this disclosure, a global threat database can be communicatively linked and/or coupled to devices running log management solution plugins and devices running SIEM plugins/software.

In at least one embodiment within this disclosure, a global can store and manage at least three levels of threat data, each of which contribute to a weighted threat scoring for each reported threat or possible threat. The three levels include normalized traditional global threat data (TGTD), malicious client information based on TGTD, and malicious client information based on heuristics and signatures of enterprise security systems, as discussed in greater detail below.

TGTD includes data collected from a list of data sources (online or otherwise) that is always shifting and growing. Such data sources include, but are not limited to, but not limited to: MalwareDomainList.com, dshield.org, AlienVault.com, and the like. TGTD contains information about malicious devices that are on the Internet, primarily servers, which include IP Addresses/Domain Names associated with malicious activity, such as (but not limited to) spamming emails servers and Botnet Command and Control (often referred to as C&C) Servers. Thus the global threat database can designate as malicious IP addresses and/or domain names as appropriate.

Malicious client information based on TGTD is data is collected by devices running one or more of the plugins described within this disclosure. Data collected by such plugin-running devices can include data pertaining to machines and users that are connecting to IP addresses and/or Domain Names that are being tracked as malicious in the TGTD. These clients are tracked in log files from enterprises or Internet Service Providers (ISPs) and the plugin assigns each device, and/or user, a unique ID which enables the system to create threat scores that can be tracked back to the original machine/user, but that obfuscate the true identity to make it easier for people to share sensitive threat data.

Malicious client information based on heuristics and signatures of enterprise security systems includes data reported by plugins running on various enterprise security devices (such as, but not limited to, intrusion prevention/detection systems, firewalls, content filters, and anti-virus engines) that receive alerts generated from these enterprise security devices (which includes, but is not limited to: generic signatures, customized signatures, and heuristic alerts/warnings) and send relevant client connection information to the global threat database. Thus an enterprise security device running one or more of the disclosed plugins can act as a data source (a reporter of threat data), thereby increasing the reliability of the global threat database and increasing the accuracy of the threat rankings discussed herein.

In at least one embodiment within this disclosure, a global threat database can be constructed using RDBMS database technology. However, the principles and methods disclosed herein can be utilized in conjunction with columnar, hadoop and other large data storage and retrieval functions.

Additionally, the global threat database can contain a web server for displaying the threat score information from the algorithms used to calculate threat score.

At least one embodiment within this disclosure implements a ranking algorithm for ranking the seriousness of cyber-threats. Such a ranking algorithm can take into account multiple factors, factors which include, but are not limited to, actions and the relative reliability of data sources which report these actions. Actions can include, but are not limited to, connecting to a C&C server, triggering a signature and violating a heuristic rule. Relative reliability of a data source can be derived from such factors as the length of time that a data source has served as a data source within one or more systems described herein, the percentage of malicious hosts/actions reported by the data source that are corroborated by other data sources. Relative reliability of a data source can also be derived from information obtained in deep dive or forensic analysis of the data source.

At least one embodiment implements an algorithm for ranking threat levels of clients, not just servers. An example algorithm is:

Threat score=('reliability of Data Source *A*' multiplied by 'threat level designated by Data Source *A*')+('reliability of data source *B*' multiplied by 'threat level designated by data source *B*')+ . . . +('reliability of enterprise data source *A*' multiplied by 'threat level designated by enterprise data source *A*')+ . . .

As discussed above, in various embodiments discussed herein, unique IDs are assigned to IP address and devices, with the goal being that all devices and IP addresses operating on the internet will be assigned unique ID. Provision of unique IDs can enable information about threats stemming from (and/or pertaining to) devices and IP addresses to be passed while preserving the anonymity of the relevant device or IP address. In this regard, data sources can designate threat scores for unique IDs on an individual basis.

In at least one embodiment within this disclosure, a system a data source can be assigned a unique identifier (ID), thereby making the data source anonymous to at least one device which is external to the data source. In at least one embodiment within this disclosure, the unique ID can be randomly assigned by an encryption algorithm.

In at least one embodiment within this disclosure, a system can utilizes an extended-domain name system-based protocol a hierarchical system of servers hosting the at least one data source, thereby enabling the system to operate in real-time or in near real-time.

In at least one embodiment within this disclosure a reliability rating or score for a data source or enterprise data source can be calculated, based on a success rate of the data source when correlated to other data sources and the time that the length of time that the data source has been contributing information to the global threat database. It will be understood that a threat level designation can be specific to each participating data source. However, threat level designations can be normalized and mapped on a larger scale, thereby rendering them more meaningful to the global threat data base as a whole. In some instances, a threat level designation can have a time component where the longer a unique ID goes without an alert or a threat registered in relation to it, its overall risk rating drops slowly. Alternatively, threat level designations can be removed altogether if the owner of the IP Address or device in question demonstrates to an appropriate administrator of the global threat database that such removal is warranted.

In at least one embodiment within this disclosure, administrators can view the quantity and reliability of the data sources that contribute to the threat score for a unique ID through a dashboard or other suitable API in order to differentiate a ranking provided by a single reliable data source as opposed to multiple data sources of dubious quality. In at least embodiment within this disclosure, such differentiation can be done automatically by a suitably programmed device.

In at least one embodiment within this disclosure, internal logs and threat data from data sources are anonymized. Anonymizing internal logs and data can have the benefit of protecting individuals and organizations, providing fidelity for threat resolution and providing fidelity in protecting against cyber threats.

Various embodiments within this disclosure pertain to, and/or include, risk algorithms for determining risk scores, as will be discussed in greater detail. These risk algorithms are examples. These risk algorithms can customized based on the particular situation in which they are utilized as described herein. For example, they can be re-ordered and/or prioritized to render a risk score without using the exact equations shown, as will be understood by persons in the art having the benefit of this disclosure.

It will be understood by persons in the art that the benefits and advantages of the systems and methods disclosed herein can be applicable in various environments in which large amounts of data are a factor. For example, the principles and systems described herein could be utilized in DNA sequencing, financial security tracking/analysis, mapping of viruses, and others.

DNA has a large data problem in that they have very large amounts of data that need to be shared between different labs performing DNA work. Embodiments within this disclosure comprise data management technology and could be used for managing any kind of data. This technology can be applied to managing DNA sequencing data across a global network of DNA sequencing labs.

Compiling and analyzing financial security data is also a large data problem. At least one embodiment within this disclosure can be applied to make analyzing and transferring this data more efficient.

At least one embodiment within this disclosure pertains to a plugin that can reside within an enterprise, an internet service provider (ISP), or hosting facility that stores or manages log data from information technology (IT) devices such as, but not limited to, switches, routers, and/or client devices. Such a plugin can sit close to the log data and act to extend the global threat database discussed herein as a distributed database, so that all of the threat data does not need to be stored globally, and that data which is sensitive to an organization can remain on premise and remain in control of the organization. As discussed above, this can lower the cost of a relevant infrastructure, since data is not replicated to a central location (with the exception of the unique IDs). Additionally, certain computing processes disclosed herein can be carried out at the data sources themselves, thereby distributing the workload and making the methods described herein be carried out more quickly than would otherwise be the case.

Aspects of this disclosure pertain to assigning unique IDs. If a unique ID were to become corrupted, it would be treated as a triggering event and an alert would be generated using one or more of the alerting mechanisms described herein.

At least one aspect of this disclosure relates to making the systems and methods described herein perform quickly. This can be done in various ways: aspects of this disclosure use distributed storage, which eliminates latency when compared to centralized solutions; computational logic and processing power can be pushed to edge nodes, which enables partial solutions to be arrived at quickly. Partial solutions can subsequently be combined, rather than waiting for all data to arrive centrally and then get a single answer. Using multiple partial answers can provide the ability to make an informed decision in real-time, even if the full result set has not been fully computed. Additionally, it will be understood the disclosed systems and methods do not pre-suppose the nature of the data like a relational database-based system would. Instead key-pairing is used to determine interesting information and pre-compute threat scores upon ingestion, thereby further reducing search latency and also reducing overall storage requirements.

At least one aspect of this disclosure pertains to the ongoing issue of increases in the number of customers and users of the systems described herein. By avoiding assumptions of ultimate size, the disclosed systems account for unlimited increases in the number of customers and customer connections. Each customer brings new data, but the disclosed distributed-storage approach means that that each customer brings new storage, thereby maintaining a system's ability to 'scale up.' However, systems described herein are also adaptable to 'scaling down;' systems and methods described herein can scale down to a single virtual machine. This can be achieved by offering the solutions described herein on an 'on-demand' basis.

In at least one embodiment within this disclosure, network devices can be secured by configuring a system to alerts an administrator when a network device turn malicious and provides the network administrator with a roadmap for remediation. In at least one embodiment within this disclosure, a system can automatically re-program security devices to prevent malicious actors from connecting to any machine on the network in question.

As discussed herein, aspects of this disclosure pertain to data sources, that is, sources of information about possible threats. Each log file connected to a described network can serve as a data source. An individual data source can identify threat data in its own way. This threat data is processed using of normalization, as will be described in greater detail.

In at least one embodiment within this disclosure, plugins can be configured to enable the querying of data sources such as enterprises, ISPs and hosting facilities. The global threat database can also be configured to enable the querying of data sources such as enterprises, ISPs and hosting facilities. The ability to make such queries can make the systems and methods disclosed herein more powerful.

In least one embodiment within this disclosure, a device can be configured (via, for example, a plugin, as discussed herein), with a dashboard interfacing with information stored in the local plugin, as well as the threat scores that are stored in the global threat database. This local dashboard can enable enterprise administrators and/or ISP administrators to receive alerts, warnings, emails, and therefore visualize and assess the threats on their own internal network.

In at least one embodiment within this disclosure, a plugin can be configured to generate threat reports identifying insider threats. This internal threat score management tool can enable customization of the dashboard elements discussed herein.

In at least one embodiment within this disclosure, a plugin running on a device within a disclosed system can assign unique IDs to local IP addresses. Such a unique ID can be uploaded to a global threat database for purposes of ranking and tracking, as discussed herein. In at least one embodiment within this disclosure, individual users can be assigned a unique ID. An IP address can be mapped to a unique user ID. An enterprise can provide access to mapping of user unique IDs to IP addresses.

In at least one embodiment within this disclosure, a plugin can be configured to plug into and/or cooperate with various defensive security solutions. Defensive security solutions are third party software and third party protocols operating on client devices or networks. Defensive security solutions include, but are not limited to, firewalls, intrusion prevention/detection systems, and/or network access control solutions.

In at least one embodiment within this disclosure, a plugin can be configured to provide the ability to search the global threat database for inbound connections, as well as the ability to search data sources such as those located at enterprises, ISPs and hosting facilities to determine the threat score of devices which attempt to interact/communicate with the client running the plugin. As discussed above, the threat score can be associated with the unique ID of the device attempting to interact/communicate with the client running the plugin.

In at least one embodiment within this disclosure, a plugin can be configured to enable the viewing of risk scores of any client or server listed in the global threat database within a distributed network within which a device running the plugin resides.

In at least one embodiment within this disclosure, a plugin can be configured with the ability to update security devices and/or generate alerts pertaining to malicious connections. Such a plugin can enable interfacing with security solutions such as, but not limited to, firewalls, intrusion prevention/detection systems, and/or network access control solutions.

At least one embodiment within this disclosure is a system for detecting, evaluating and preventing cyberthreats. The system can include an online-analytical-processing (OLAP) resource, a data mining engine coupled to the OLAP resource, a reporting resource coupled to the OLAP resource, and a processor coupled to the OLAP resource the data source(s). The processor can be associated with at least one extract-transform-load (ETL) module. The ETL module can be configured and include computer readable instructions to cause the processor, upon execution of the instructions, to perform various tasks. The processor running the ETL module can extract at least one data tuple from the data source and thereafter or concurrently, transform the data tuple for further analysis and retrieval, either by other components of the system and/or by one or more authorized personnel. Transforming the data tuple can include normalizing the data tuple according to a predetermined policy and removing sensitive information (such as private information). The transformed data tuple (TDT) can be loaded to the OLAP resource (102).

In at least one embodiment within this disclosure, the OLAP resource can be configured to store the loaded TDT and analyze the loaded TDT with reference to data acquired by the data mining engine and with reference to at least one previously stored TDT according to at least one predetermined algorithm. Within the predetermined algorithm a measure of similarity between the loaded TDT and the previously stored TDT can be a factor. The predetermined algorithm can thus be used to evaluate the similarity between the TDT in question and other previous TDTs. A higher degree or measure of similarity can be an indication of the seriousness and/or weight to be given the TDT in question. The predetermined algorithm can include and/or factor in a reliability score associated with the data source from which the TDT was extracted. Thus a threat indicator from data source with a higher reliability score can be treated more seriously than a threat indicator from a data source with a lower reliability score, all else being equal. The OLAP resource can assign a threat score to the data source from which the TDT was extracted, according to the predetermined algorithm. The OLAP resource can upload the at least one threat score to one or more reporting resources. Such reporting resource can be configured to store threat scores for subsequent retrieval. The threat scores can be stored in a database external to the OLAP resource. The database can be secured from unauthorized access as appropriate.

In at least one embodiment within this disclosure, the data mining engine discussed above can be connected to the cloud and/or an external computer and/or network. The system can work in conjunction with other security settings and devices. For example, in at least one embodiment within this disclosure the ETL module can be configured for interoperability with at least one firewall. Thus, the system could derive threat information from firewall software running on a device within the system.

In at least one embodiment within this disclosure, when data is extracted from a data source, the system can remove sensitive and/or private information prior to or during the extraction. The sensitive and/or private information can be stored local to the data source, either at the data source itself or within a device in the same local network as the data source.

In at least one embodiment within this disclosure, the OLAP resource can reside within a distributed network. In at least one embodiment within this disclosure, the OLAP resource can be hosted by one or more servers, such as a web server.

Various methods of detecting, evaluating and preventing cyber-threats are disclosed. At least one method within this disclosure can include extracting at least one data tuple from at least one data source. Extracting can be performed by at least one processor running at least one extract-transform-load (ETL) module. A processor can be a microprocessor or other suitable device capable of executing computer readable instructions. At least one method within this disclosure can include transforming the data tuple. Transforming the data tuple can include comprises normalizing the data tuple according to a predetermined policy and removing sensitive information from the data tuple. The method can further include loading the transformed data tuple (TDT) to at least one OLAP resource. The method can include storing the loaded TDT, either at the OLAP resource in some other suitable location. The method can further include analyzing the loaded TDT with reference to data acquired by at least one data mining engine and with reference to at least one previously stored TDT, retrieved from the same data source or a different data source. The analysis can be performed according to at least one predetermined algorithm in which at least one measure of similarity between the loaded TDT and the previously stored TDT is a factor. The predetermined algorithm can involve utilization of a reliability score associated with the data source from which the TDT was extracted. A reliability score can be directed to how reliable a given data source has been historically. The existence of a threat (or possible threat) can be treated more seriously when it is derived from information or data coming from a data source with a high reliability score than from a data source with a low reliability score.

At least one method within this disclosure can include a step of assigning at least one threat score to the data source from which a TDT was extracted, in accordance with the predetermined algorithm discussed above. The method can also include uploading the threat score to at least one reporting resource. A reporting resource can be configured to collate and store the threat score for subsequent retrieval. Threat scores can be stored locally and/or locally with respect to the reporting resource.

In at least one embodiment within this disclosure, each device (including clients and servers) on the internet encountered by the system is assigned a unique ID.

In at least one embodiment within this disclosure, each device on the internet encountered by the system is assigned a unique ID for the purpose of tracking and obfuscating the true end client identity.

In at least one embodiment within this disclosure, each device on the internet encountered by the system is assigned a unique ID for the purpose of tracking AND obfuscating the true end client identity, with an anonymous unique ID.

At least one embodiment within this disclosure provides for a threat score rating and reporting system that assigns threats to end point machines (clients and servers) throughout the Internet.

At least one embodiment within this disclosure provides for a threat score rating and reporting system that assigns threats to users throughout the Internet.

At least one embodiment within this disclosure provides for a threat score rating and reporting system that assigns threats to unique IDs throughout the Internet.

At least one embodiment within this disclosure provides for a threat score rating and reporting system that leverages enterprise security device configuration (including but not limited to customized signatures and heuristic alerts/warnings) as a data source for assigning threat levels to devices.

At least one embodiment within this disclosure provides for a threat score rating and reporting system that leverages enterprise security device configuration (including but not limited to customized signatures and heuristic alerts/warnings) as a data source for assigning threat levels to users.

At least one embodiment within this disclosure provides for a threat score rating and reporting system that leverages enterprise security device configuration (including but not limited to customized signatures and heuristic alerts/warnings) as a data source for assigning threat levels to unique IDs.

In at least one embodiment within this disclosure, the global threat database discussed herein is extended beyond its centralized capabilities to include log file tools located at enterprises, ISPs and hosting facilities to create a full global threat picture through a distributed database enabling vastly larger storage.

In at least one embodiment within this disclosure, the global threat database discussed herein is extended beyond its centralized capabilities to include log file tools located at enterprises, ISPs and hosting facilities to create a full global threat picture through a distributed database enabling much faster response times than a centralized system that tried to store the same amount of data because there is no synchronization that needs to occur and the localized databases are much smaller and faster to search through.

In at least one embodiment within this disclosure, the global threat database discussed herein uses a system similar to DNS protocol that maps IP Addresses to unique IDs, instead of the normal operation of DNS that maps IP Addresses to Domain Names.

In at least one embodiment within this disclosure, the global threat database discussed herein uses a system similar to DNS protocol that uses reverse DNS capability to map unique IDs to IP Addresses, instead of the normal operation of reverse DNS, which maps Domain Names to IP Addresses.

In at least one embodiment within this disclosure, the global threat database discussed herein is a system similar to DNS system of caching to include the caching of mappings of IP Addresses to unique IDs, instead of the normal operation of the DNS system to cache the mappings of Domain Names to IP Addresses.

In at least one embodiment within this disclosure, the global threat database discussed herein uses a system similar to DNS system of caching to include the caching of reverse mappings of IP Addresses from unique IDs, instead of the normal operation of the DNS system to cache the reverse mappings of Domain Names from IP Addresses.

In at least one embodiment within this disclosure, the global threat database discussed herein uses a system similar to DNS protocol to push up the DNS hierarchical chain threat data from a data source that is connected to the system.

In at least one embodiment within this disclosure, the global threat database discussed herein a system similar to DNS protocol to manage a hierarchical system of data source servers of Threat Data that enable hyper-fast near real-time query and responses.

In at least one embodiment within this disclosure, the global threat database discussed herein uses a system similar to DNS protocol's global caching system to reduce the network traffic on the centralized part of PGTD and reduce response times through a hierarchical system of caching and data source servers of threat data that enable hyper-fast near real-time query and responses.

In at least one embodiment within this disclosure, the global threat database discussed herein uses a system similar to DNS protocol's aggressive use of User Datagram Protocol (UDP) to reduce the network traffic on the centralized part of PGTD through a hierarchical system of caching and data source servers of threat data that enable hyper-fast near real-time query and responses.

Figure 1:
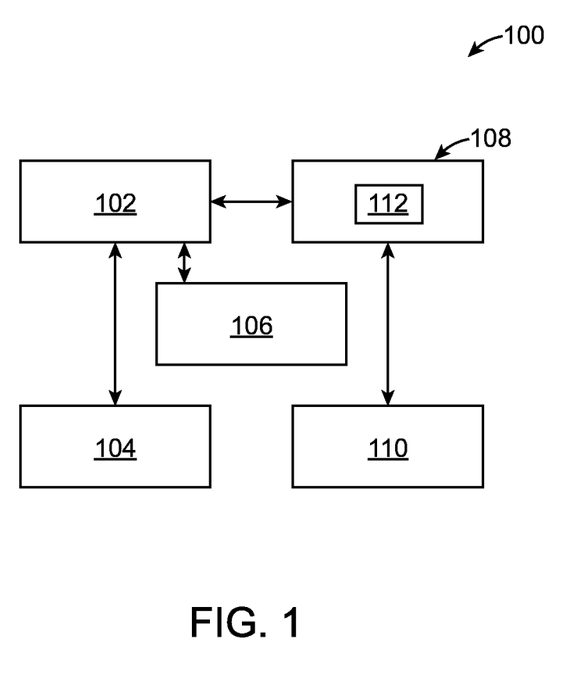
FIG. 1 illustrates an embodiment of a system for detecting, evaluating and preventing cyber-threats, according to the present disclosure.

FIG. 1 illustrates an embodiment of a system 100 for detecting, evaluating and preventing cyber-threats. The embodiment shown in FIG. 1 comprises an online-analytical (OLAP) resource 102. The embodiment shown in FIG. 1 also comprises a data mining engine 104, which is coupled to the OLAP resource 102. The data mining engine 104 can be coupled to external sources of data, such as, for example, the cloud, a network, and/or an external data base (not shown). The embodiment shown in FIG. 1 also comprises a reporting resource 106. Like the data mining engine 104, the reporting resource 106 is coupled to the OLAP resource 102. The embodiment illustrated in FIG. 1 also comprises a processor resource 108. The processor resource 108 can be a processor (or a microprocessor) or group of cooperative processors, or some other suitable device. In the embodiment illustrated in FIG. 1, the processor 108 is coupled to the OLAP resource and a data source 110. The processor 108 can be configured to run one or more extract-transform-load (ETL) modules 112. The ETL module 112 can contain instructions that, when executed by the processor 108, cause the processor 108 to perform various functions. For example, the processor 108 can cause data to be extracted from the data source 110. The data can be in the form of one or more data tuples. The processor 108 running the ETL module 112 can transform extracted data tuples. Transforming a data tuple can include normalizing the data tuple. Normalization can occur in keeping with a predetermined policy or set of rules to make the data tuple statistically useful by a global threat data base (not shown), as discussed above. Transformation of the extracted data tuple can also involve removing or stripping sensitive information. Removing sensitive information can be advantageous because such removal can help to maintain the privacy of the data source 110 which provides the data to the processor 108/ETL module 112. The processor 108/ETL module 112 can load (or upload) transformed data tuples (TDT) to the OLAP resource 102. The OLAP resource 102 can store TDT, either local to the OLAP resource 102, the global threat data base (not shown), and/or another suitable storage device (or devices). The OLAP resource 102 can analyze the loaded TDT according to various parameters within this disclosure, including, but not limited to, the various algorithms discussed. The OLAP resource 102 can analyze TDTs at least in part by comparing a TDT with data/information collected by the data mining engine 104. Data collected by the data mining engine 104 can include threat data associated with the many sources of data on the internet (not shown). The OLAP resource 102 can compare a TDT with other TDTs that were previously extracted and stored. If a TDT in question is similar to other TDTs, the similarity can be an indicator that the TDT is more significant than would otherwise be the case. When the OLAP resource 102 analyzes the TDT, the OLAP resource 102 can use the reliability of the data source 110 that provided the TDT as a factor. Using the reliability of the data source 110 can mean factoring a reliability score for the data source 110, as discussed above. As a result of the analysis discussed above, the OLAP resource 102 can assign a threat score (or risk score) to the data source 102 which provided the TDT, according to the predetermined algorithm.

The OLAP resource 102 can upload the determined threat score to the global threat data base (not shown). The OLAP resource 102 can upload the threat score to the reporting resource 106. The reporting resource 106 can collate the threat score that has been assigned to the data source 110 with other threat scores and other information. The reporting resource can store the threat score in the global threat database for subsequent retrieval and use in future analysis. It will be understood that the functions performed by the components described above will, in many embodiments, be performed on an ongoing basis with regarding to multiple data sources 110. By collecting data from multiple data sources 110, the system can locate sources of possible cyber threats. Once located, cyber threats can be isolated and—if properly managed—eliminated.

As noted above, in at least one embodiment, the data mining engine 104 can be coupled to the cloud. The data mining engine 104 can be coupled (and draw data/information) from the internet, the World Wide Web, other data sources, external devices and networks, or any combination thereof.

In at least one embodiment, the processor 108 running an ETL module 112 can work cooperatively with a security service such as a firewall. For example, a firewall resource running on a data source 110 client device could notify the processor 108/ETL module 112 that an attempt to breach the firewall has been detected. The breach attempt could be incorporated within a data tuple for extraction and transformation as discussed above.

In at least one embodiment within this disclosure, an OLAP resource 102 can be distributed within a network. An OLAP resource can be hosted by a web server or other suitable hosting device or suitable hosting system.

Figure 2:
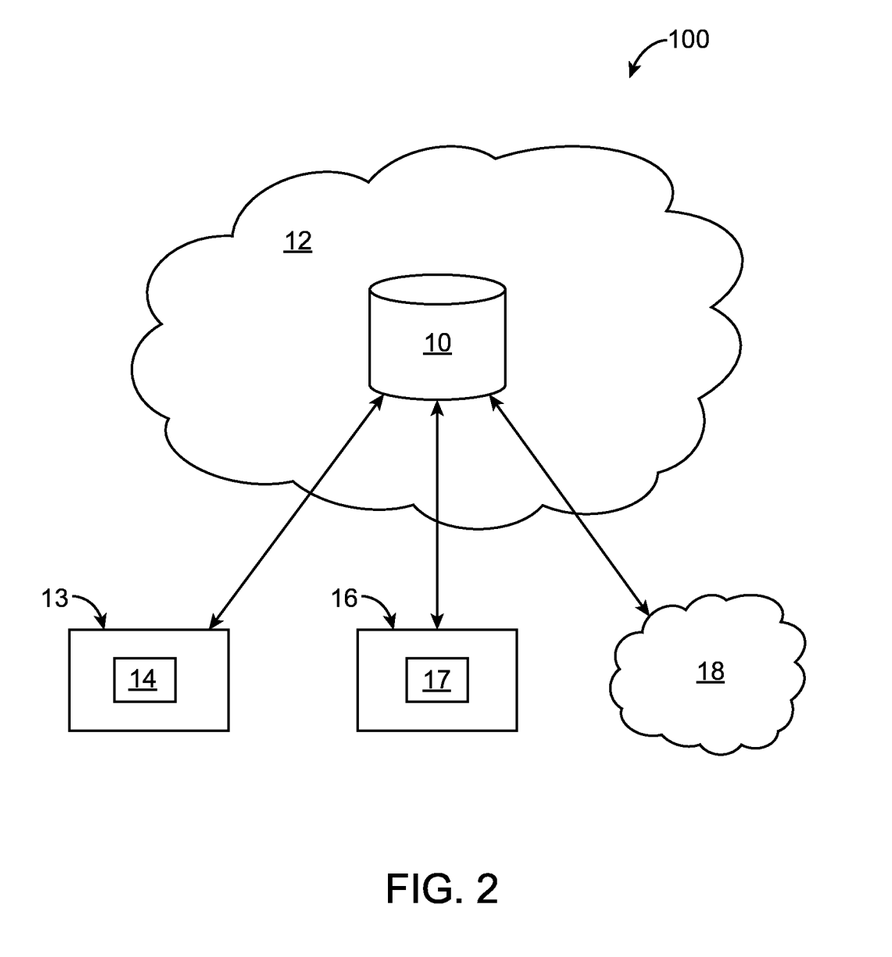
FIG. 2 illustrates another embodiment of a system for detecting, evaluating and preventing cyber-threats, according to the present disclosure.

FIG. 2 illustrates another embodiment of a system 100 for detecting, evaluating and preventing cyber-threats. It will be understood that some or all of the aspects of the embodiments described in FIGS. 1 and 2 are combinable to achieve the purpose of detecting, evaluating and preventing cyber-threats. The system 100 illustrated in FIG. 2 includes at least one global threat data base 10. The global threat data base 10 can, as shown, reside within the cloud 12. It will be understood that the global threat data base can reside within a distributed network (not shown) or a centralized facility (not shown), and that other configurations and arrangements for the global threat data base 10 are possible within this disclosure. The global threat data base 10 can store threat scores for unique IDs (unique IDs being assigned to data sources 110). As discussed above, the method of assigning unique IDs to data sources 110 can keep the data sources 110 anonymous while allowing threats to be identified and tracked. The threat scores can be ranked as to their seriousness, as discussed above. A global threat data base (which can include or operate in conjunction with and OLAP resource (102)) can be coupled to a first network (or device) 13 running a protection module 14. The protection module (or simply "protect" module) can provide threat scores for inbound connections, and report signature and/or heuristic rule violations to the global threat data base (as within one or more data tuples, as discussed above). The global threat data base 10 can also be coupled to an enterprise 16 running one or more report plugins. The "report enterprise" can link the enterprise 16 to other devices and user unique IDs, (unique IDs assigned to users). The global threat data base 10 can also be coupled to an internet service provider (ISP), a "report" ISP 18, which links the global threat data base 10 to one or more enterprise unique IDs (assigned to enterprise data sources 110).

As discussed above, the global threat data base 10 can store various levels/types of threat data, including normalized traditional global threat data (TGTD) collected from various sources of data, malicious client information based on TGTD collected from devices and networks running the protect plugin and/or report plugins discussed above, and malicious client information based on signature and heuristic rule violations reported enterprise security devices running one or more protect plugins, as described herein. As indicated above, the global threat data base can be configured using RDBMS database technology. The global threat data base 10 can contain one or more webservers for displaying threat scores associated with unique IDs corresponding to data sources 110, IP addresses and individuals.

With regard to enterprise systems and systems 16, a plugin 17 running on an enterprise 16 can operate in cooperation with intrusion prevention/detection systems, firewalls, content filters, and anti-virus engines running on an enterprise 16. Consequently, each such enterprise 16 is turned into a data source 110 for purposes of increasing the reliability of the global threat data base 10 and the threat scores and threat rankings stored therein. A plugin 17 sitting within an enterprise 16 (or ISP or hosting facility storing or managing log data from IT devices like switches, routers and/or client devices). The "report" plugin 17 sites close to log data and extends the effective reach of the global threat database and eliminates for all threat data to be stored globally. The report plugin 17 enables sensitive data to remain with the organization or data source 110 that generated the sensitive data. This operation can also have the benefit of reducing infrastructure costs, since it obviates the need for unnecessary duplication of data (including, but not limited to, sensitive data). A device (for example within enterprise 16) running the report plugin 17 can respond to queries for threat data from the global threat data base 10. The report plugin 17 can also respond to requests for data coming from devices running a protect plugin 14. The report plugin 17 can also provide a dashboard (not shown) interfacing with the information that is stored on the device running the report plugin 17 and interfacing with threat scores stored in the global threat data base 10. Such a dashboard can be configured to provide enterprise administrators and/or ISP administrators with alerts, warnings and emails pertaining to threats. Such a dashboard can also be configured to enable an enterprise administrator and/or an ISP administrator to visualize and assess data on their own internal networks.

Figure 3:
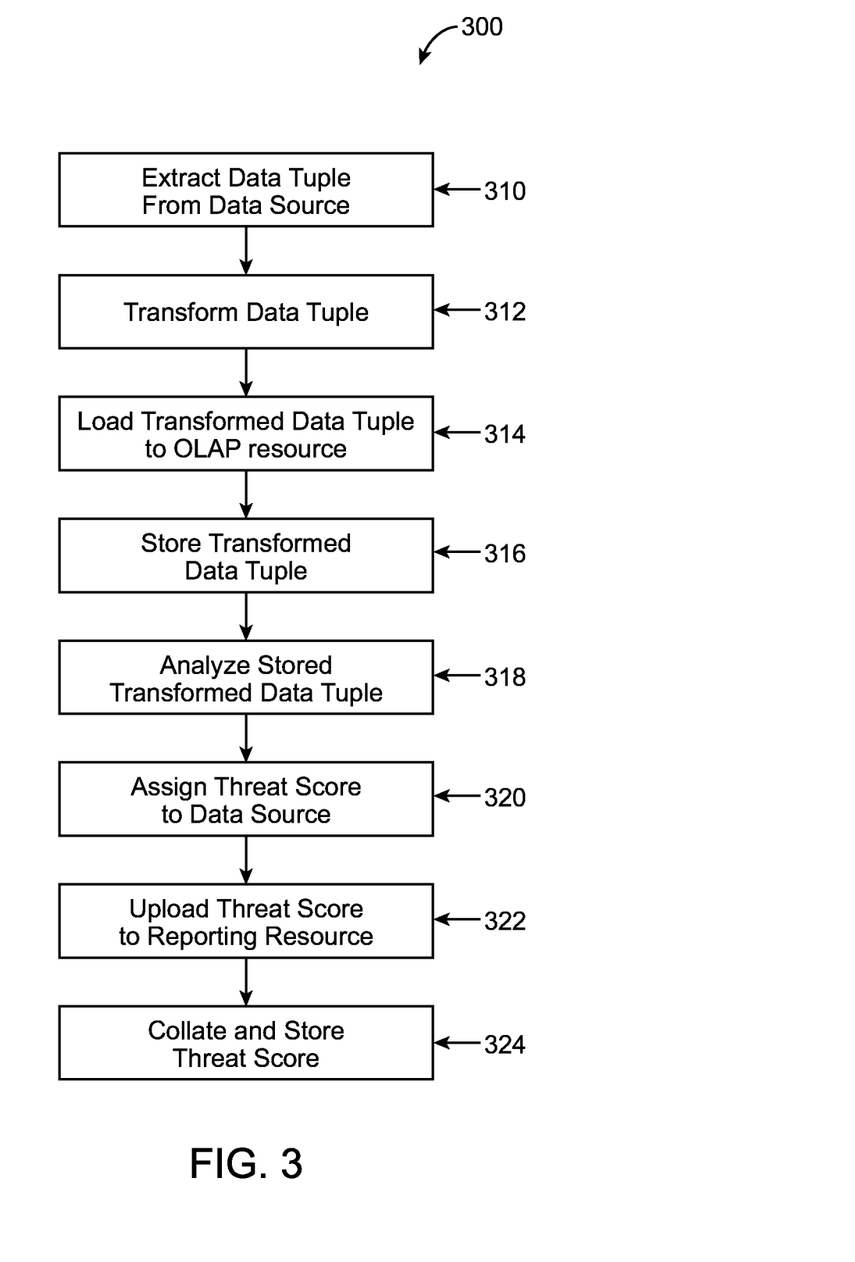
FIG. 3 illustrates an example method of detecting, evaluating and preventing cyber-threats.

FIG. 3 illustrates an example method 300 of detecting, evaluating and preventing cyber-threats. At step 310, a data tuple is extracted by a processor module 108 (which can be one or more processors and/or one or more microprocessors) running an extract-transform-load (ETL) module 112 from at least one data source 110 (such as for example, an enterprise system, network or device). The method 300 can then proceed to step 312, in which the extracted data tuple is transformed. Transformation can include normalizing the data tuple according to an algorithm chosen by a system administrator and/or policy. Normalization can be performed to make the information within the data tuple be statistically comparable with other data tuples and threat data within the system 100/global threat data base 10. After the data tuple is transformed, the transformed data tuple (TDT) loaded to one or more online analytical processing (OLAP) resource 102, as in step 314. The method 300 can then proceed to step 316, in which the TDT is stored by the OLAP resource 102, either within the OLAP resource 102 or the global threat data base (10) or both. The method 300 can then proceed to step 318, in which the TDT is analyzed in light of data collected by a data mining engine 104 and with regarding to one or more previously obtained and stored TDTs according to an algorithm which takes into account the similarity of the TDT to other previously determined TDTs. The algorithm can include a reliability score corresponding to each unique ID corresponding to the data sources 110 which generated the TDT in question and the previously acquired TDTs to which the TDT in question is compared. At step 320, the algorithm is used to assign a threat score to the unique ID (and thereby, anonymously, to the data source 110 bearing the unique ID). The method 300 can then proceed to step 322 in which the threat score for the unique ID can be uploaded to a reporting resource 106, such as for example, a device running a report plugin 17, as described above. The method 300 can then proceed to step 324. At step 324 the reporting resource 106 can collate and store the threat score with other threat scores (associated with other TDTs), either locally to the reporting resource 106, or to the global threat data base 10, for subsequent retrieval and use in analyzing other TDTs and or possible cyber-threats. It will be understood that all of the steps described may not be necessary to practice every aspect of this disclosure. Additionally, it will be understood that additional steps may be implemented in conjunction with the described steps without departing from this disclosure. Moreover, some of the steps may be implemented in an order different from the one presented above, without departing from this disclosure.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of execution, ordering of steps and arrangement of the components within the principles of the present disclosure to the full extent indicated by the broad general meaning of the terms used in the attached claims. It will therefore be appreciated that the embodiments described above may be modified within the scope of the appended claims. Example clauses are shown below.

AA. Assignment of a unique ID for every device on the Internet (servers and clients) for the purpose of tracking and obfuscating the true end client identity.

BB. Assignment of a unique ID for users on the Internet for the purpose of tracking AND obfuscating the true end client identity, with an anonymous unique ID.

CC. Providing a threat score rating and reporting system that assigns threats to end point machines (clients and servers) throughout the Internet.

DD. Providing a threat score rating and reporting system that assigns threats to users throughout the Internet.

EE. Providing a threat score rating and reporting system that assigns threats to unique IDs throughout the Internet.

FF. Providing threat score rating system that leverages enterprise security device configuration (including but not limited to customized signatures and heuristic alerts/warnings) as a data source for assigning threat levels to devices.

GG. Providing a threat score rating system that leverages enterprise security device configuration (including but not limited to customized signatures and heuristic alerts/warnings) as a data source for assigning threat levels to users.

HH. Providing a threat score rating system that leverages enterprise security device configuration (including but not limited to customized signatures and heuristic alerts/warnings) as a data source for assigning threat levels to unique IDs.

II. The system as described above wherein the global threat data base is extended beyond its centralized capabilities to include log file tools located at enterprises, ISPs and hosting facilities to create a full global threat picture through a distributed database enabling vastly larger storage.

JJ. The system as described above wherein the global threat data base is extended beyond its centralized capabilities to include log file tools located at enterprises, ISPs and hosting facilities to create a full global threat picture through a distributed database enabling much faster response times than a centralized system that tried to store the same amount of data because there is no synchronization that needs to occur and the localized databases are much smaller and faster to search through.

KK. The system as described above wherein the global threat data base uses an system similar to DNS protocol that maps IP Addresses to unique IDs, instead of the normal operation of DNS that maps IP Addresses to Domain Names.

LL. The system as described above wherein the global threat data base uses an a system similar to DNS protocol that uses reverse DNS capability to map unique IDs to IP Addresses, instead of the normal operation of reverse DNS, which maps Domain Names to IP Addresses.

MM. The system as described above wherein the global threat data base uses an a system similar to DNS system of caching to include the caching of mappings of IP Addresses to unique IDs, instead of the normal operation of the DNS system to cache the mappings of Domain Names to IP Addresses.

NN. The system as described above wherein the global threat data base uses an a system similar to DNS system of caching to include the caching of reverse mappings of IP Addresses from unique IDs, instead of the normal operation of the DNS system to cache the reverse mappings of Domain Names from IP Addresses.

OO. The system as described above wherein the global threat data base uses an a system similar to DNS protocol to push up the DNS hierarchical chain threat data from a data source that is connected to the system.

PP. The system as described above wherein the global threat data base uses an a system similar to DNS protocol to manage a hierarchical system of data servers of Threat Data that enable hyper-fast near real-time query and responses.

QQ. The system as described above wherein the global threat data base uses an a system similar to DNS protocol's global caching system to reduce the network traffic on the centralized part of the global threat data base and reduce response times through a hierarchical system of caching and data source servers of threat data that enable hyper-fast near real-time query and responses.

RR. The system as described above wherein the global threat data base implements an a system similar to DNS protocol's aggressive use of User Datagram Protocol (UDP) to reduce the network traffic on the centralized part of PGTD through a hierarchical system of caching and data source servers of threat data that enable hyper-fast near real-time query and responses.

What is claimed is:

1. A system for detecting, evaluating and preventing cyber-threats, the system comprising:
at least one online-analytical-processing (OLAP) resource; at least one data mining engine coupled to the OLAP resource;
at least one reporting resource coupled to the OLAP resource; and at least one processors coupled to the OLAP resource and coupled to at least one data source, the processor having at least one extract-transform-load (ETL) module associated therewith, the ETL module configured, upon execution by the at least one processor, to:
extract at least one data tuple from the data source;
transform the data tuple, wherein transforming the data tuple comprises normalizing the data tuple according to a predetermined policy and removing sensitive information from the at least one data tuple; and
load the transformed data tuple (TDT) to the OLAP resource, wherein the OLAP resource is configured to:
store the loaded TDT,
analyze the loaded TDT with reference to data acquired by the data mining engine and with reference to at least one previously stored TDT according to at least one predetermined algorithm wherein at least one measure of similarity between the loaded TDT and the previously stored TDT is a factor, the predetermined algorithm including a reliability score associated with the data source from which the TDT was extracted,
assign at least one threat score to the data source from which the TDT was extracted, according to the predetermined algorithm, and
upload the threat score to the at least one reporting resource; and
wherein the reporting resource is configured to collate and store the threat score for subsequent retrieval.

2. The system of claim 1, wherein the data mining engine is coupled to a cloud.

3. The system of claim 1, wherein the data mining engine is coupled to an external network.

4. The system of claim 1, wherein the ETL module is configured for interoperability with at least one firewall.

5. The system of claim 1, wherein the sensitive information is stored locally to the data source.

6. The system of claim 1, where the OLAP resource resides within a distributed network.

7. The system of claim 1, wherein the OLAP resource is hosted by at least one web server.

8. The system of claim 1, wherein the data source is assigned a unique identifier (ID), thereby making the data source anonymous with respect to at least one device which is external to the data source.

9. The system of claim 8, wherein the unique ID is randomly assigned by an encryption algorithm.

10. The system of claim 1, wherein the system utilizes a Domain Name System-modeled protocol to manage a hierarchical system of servers hosting the at least one data source, thereby enabling the system to operate in real-time or in near real-time.

11. A method of detecting, evaluating and preventing cyber-threats, the method comprising:

extracting, by at least one processor running at least one extract-transform-load (ETL) module, at least one data tuple from at least one data source;

transforming the data tuple, wherein transforming the data tuple comprises normalizing the data tuple according to a predetermined policy and removing sensitive information from the data tuple;

loading the transformed data tuple (TDT) to at least one OLAP resource;

storing the loaded TDT;

analyzing the loaded TDT with reference to data acquired by at least one data mining engine and with reference to at least one previously stored TDT, according to at least one predetermined algorithm in which at least one measure of similarity between the loaded TDT and the previously stored TDT is a factor, the predetermined algorithm including a reliability score associated with the data source from which the TDT was extracted;

assigning at least one threat score to the data source from which the TDT was extracted, according to the predetermined algorithm; and uploading the threat score to at least one reporting resource, wherein the reporting resource is configured to collate and store the threat score for subsequent retrieval.

12. The method of claim 11, wherein the data mining engine is coupled to a cloud.

13. The method of claim 11, wherein the data mining engine is coupled to an external network.

14. The method of claim 11, wherein the ETL module is configured for interoperability with at least one firewall.

15. The method of claim 11, wherein the sensitive information is stored locally to the data source.

16. The method of claim 11, where the OLAP resource resides within a distributed network.

17. The method of claim 11, wherein the OLAP resource is hosted by at least one web server.

18. The method of claim 11, wherein the data source is assigned a unique identifier (ID), thereby making the data source anonymous with respect to at least one device which is external to the data source.

19. The method of claim 18, wherein the unique ID is randomly assigned by an encryption algorithm.

20. The method of claim 11, wherein the method utilizes a Domain Name System-modeled protocol to manage a hierarchical system of servers hosting the at least one data source, thereby enabling the method to operate in real-time or in near real-time.

* * * * *